(No Model.)

W. O. WAKEFIELD & S. H. LIBBY.
FRICTION CLUTCH.

No. 508,663. Patented Nov. 14, 1893.

Witnesses.
A. F. Macdonald.
A. O. Drue

Inventors.
William O. Wakefield
Sam. H. Libby
by Burkey & Knight Attys.

UNITED STATES PATENT OFFICE.

WILLIAM O. WAKEFIELD AND SAM HAMMOND LIBBY, OF LYNN, MASSACHUSETTS.

FRICTION-CLUTCH.

SPECIFICATION forming part of Letters Patent No. 508,663, dated November 14, 1893.

Application filed July 10, 1891. Serial No. 399,053. (No model.)

*To all whom it may concern:*

Be it known that we, WILLIAM O. WAKEFIELD and SAM HAMMOND LIBBY, citizens of the United States, residing at Lynn, in the county of Essex and State of Massachusetts, have invented a certain new and useful Improvement in Friction-Clutches, of which the following is a specification.

The present invention relates to improvements in friction clutches.

The object of the invention is to secure a clutch which has the maximum efficiency in the space at disposal, and which can be quickly worked by the operator.

Figure 1:
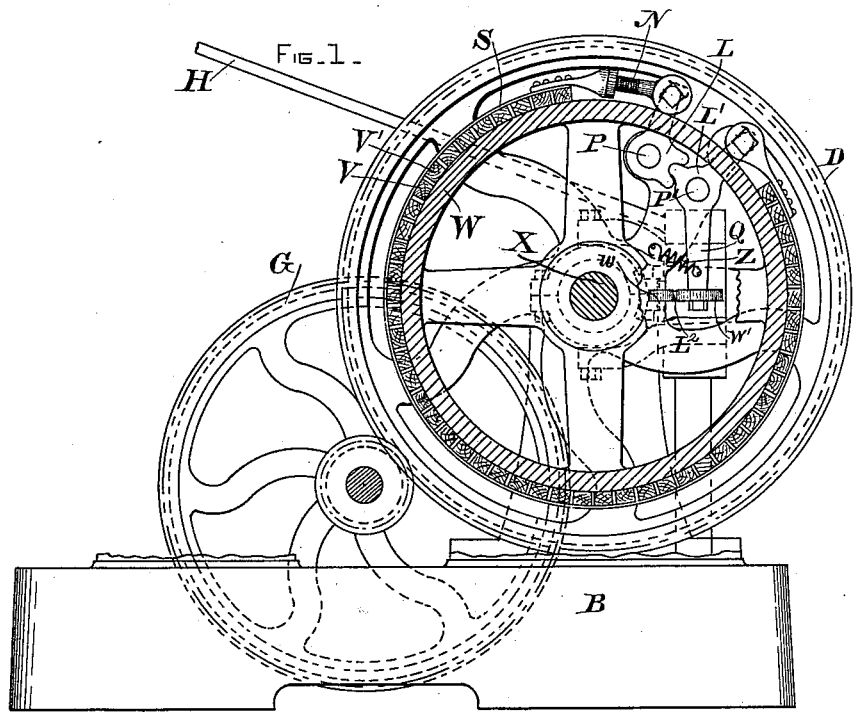
Figure 2:
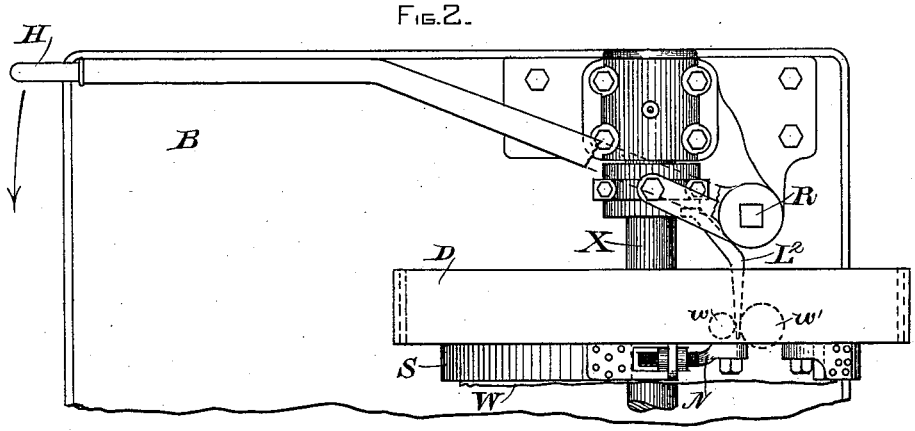

Figure 1 is a side elevation of the clutch, and Fig. 2 a plan view of the same.

B is a bed plate upon which is supported the machinery to which the clutch is to be applied, and G is a gear wheel, representing any mechanism, for driving the wheel W, surrounding which latter wheel is the clutch band or strap S of steel or other strong, elastic metal, and having wooden or similar bearing parts V V′, &c., secured to it and encircling the greater part of the wheel W. One end of the strap S is secured to a lever L′, as shown, and the other end of the strap S is secured to the lever L by means of a take up screw and nut N. The levers L, L′, are pivoted at P, P′ respectively to the driven part D rotatable about the same axis as wheel W, and are made to engage with each other by a single tooth in one and a corresponding recess in the other as shown. Any means of making them co-operative instead of that shown may be employed, the object being that when a motion is given to one lever, L′ or L, it may be communicated to the other and move both ends of the strap S simultaneously. One of the levers as L′ has also an arm Q extending toward the shaft, and at its end carries a small wheel $w'$. Another small wheel $w$ is borne upon one of the spiders of the wheel W in a plane parallel to that of the wheel $w'$ and the peripheries of these two wheels are approximated, as shown. The lever H for operating the clutch is fulcrumed at R, and engages with a sliding collar embracing the shaft X and this collar is capable of being moved laterally in the usual manner by the lever H. From this collar there projects a taper finger $L^3$ so disposed, when the lever H is manipulated to move it in the direction of the arrow, as to pass between the wheels $w\ w'$, and separate them and thereby operate the arm Q of the lever L′, and the lever L geared thereto, and thus bring the two ends of the strap S toward each other, tightening the clutch about the wheel W and transmitting power to a hoisting drum, or other machinery. Upon the reverse motion being imparted to the lever H and the withdrawal of the finger $L^2$ the spring Z retracts the levers L′ L to loosen the clutch at both ends. It will be seen that the action is very positive and quickly executed both as to the gripping and loosening motions. It will also be seen that the part D may be either a driving or driven part and inasmuch as it carries the levers L L′ we have designated it as a carrier.

What we claim as new, and desire to secure by Letters Patent, is—

1. The combination in a friction clutch of the friction wheel, the band bearing against the same, the levers pivoted on separate pins and connected so as to move simultaneously, said levers being attached to opposite ends of said band and carried by a part rotatable about the same axis as the friction wheel, and manually actuated devices engaging with said levers to simultaneously operate them.

2. The combination in a friction clutch of the friction wheel, the band bearing against the same, the levers engaging with one another and attached to opposite ends of said band and carried by a part rotatable about the same axis as the friction wheel, and manually actuated devices engaging with said levers to simultaneously operate them.

3. The combination of the friction wheel the band around the same, the levers attached to opposite ends of said straps and having interengaging projections and pivoted to a rotatable carrier, a shifting collar having a projection engaging with one of said levers and a manual device engaging with said collar.

4. The combination of the friction wheel, the friction band and the lever attached to the same and pivoted to a rotatable carrier, said lever having an anti-friction roller, the collar rotating with said carrier and having a cam projection engaging with the roller on the lever, and a manual device to shift the collar, and thereby cause the cam projection to operate the lever.

In testimony whereof we have hereto set our hands this 8th day of July, 1891.

WILLIAM O. WAKEFIELD.
SAM HAMMOND LIBBY.

Witnesses:
JOHN W. GIBBONEY,
ELIHU THOMSON.